United States Patent [19]
Fernandes et al.

[11] 3,887,852
[45] June 3, 1975

[54] CONTROL SYSTEM FOR ROTATING ELECTRICAL MACHINERY USING ELECTRONICALLY DERIVED INJECTED ROTOR EMF'S

[76] Inventors: Roosevelt A. Fernandes, 5607 Bear Rd., Apt. K-12, North Syracuse, N.Y. 13212; Harry R. Sanders, 3709 Trimble Rd., Nashville, Tenn. 37215

[22] Filed: Dec. 13, 1973

[21] Appl. No.: 424,416

Related U.S. Application Data

[63] Continuation-in-part of Ser. No. 308,701, Nov. 22, 1972, abandoned.

[52] U.S. Cl. .............................. 318/197; 318/237
[51] Int. Cl. ............................................ H02p 7/36
[58] Field of Search ........................... 318/197, 237

[56] References Cited
UNITED STATES PATENTS

| | | | |
|---|---|---|---|
| 3,242,408 | 3/1966 | Hetzel ................................. | 318/197 |
| 3,379,947 | 4/1968 | Lalonde ............................. | 318/237 |
| 3,506,900 | 4/1970 | Neuffer et al ...................... | 318/237 |

Primary Examiner—G. Z. Rubinson
Attorney, Agent, or Firm—Charles S. McGuire

[57] ABSTRACT

A unique means for automatic closed-loop speed and power factor regulation, both below and above synchronous speed, using electronically derived, rotor injected EMF's for rotating electrical machinery, with no power pulsations, and smooth continuous control is described. EMF's of the correct frequency are electronically derived and modulated to the appropriate amplitude, without the use of a current transformer and its associated saturation problems, using feedback signals from a speed transducer for comparison with a reference signal for master control. This arrangement allows independent setting of the speed and rotor power factor angle. Speed regulation at the desired setting is maintained through feedback controls. Unlike previous art this technique allows speed control beyond synchronous speed, with no torque pulsations, minimum rotor power loss and also allows elimination of slip rings.

The invention may also be employed in other forms of rotary electrical machinery including d.c. and single phase a.c.

10 Claims, 13 Drawing Figures

NORMAL OPERATION
$V_i = 0$   $n = n_r$ (RATED SPEED)

$V_i < S_W E_2$ AND IN PHASE OPPOSITION
$n < n_r$ $V_i < S_W E_2$ AND IN PHASE
$n\ n_r$ $V_i = S_W E_2$ AND IN PHASE
$n\ n_s$ (SYNCHRONOUS SPEED)

CONTROL SYSTEM FOR ROTATING ELECTRICAL MACHINERY USING ELECTRONICALLY DERIVED INJECTED ROTOR EMF'S

REFERENCE TO RELATED APPLICATION

This is a continuation-in-part of U.S. application Ser. No. 308,701, filed Nov. 22, 1972, now abandoned.

BACKGROUND OF THE INVENTION

The present invention relates to speed control of rotating electrical machines and power factor control in alternating current machines, and more specifically to induction motor control means utilizing injected rotor EMF's.

Most methods of speed control for induction motors in the past have been based on (a) varying the line frequency, (b) varying the line voltage, (c) varying the rotor resistance (d) changing the number of poles, (e) control of firing angle of silicon controlled rectifiers in the rotor circuit, or pulsed switching of silicon controlled rectifiers placed across resistances in the rotor circuit, consequently varying the average torque, (f) inserting voltages of the appropriate slip frequency in the rotor circuit using auxiliary machines, otherwise known as injected rotor EMF's.

All of the methods have certain advantages and disadvantages. Methods based on categories (a), (b), (c) and (d) require that the speed controller be capable of handling the full power of the motor. Most of the recent inventions come under category (e) but suffer from the disadvantages of pulsed torque and harmonic voltages due to truncated rotor voltage waveforms with control limited to below synchronous speeds. Category (f) has been implemented through the use of auxiliary machines which are bulky and costly, typical examples being those systems known as Leblanc, Schrage, Kramer, and others.

Accordingly, it is a principal object of the present invention to provide speed control means for a.c. machinery which operates on injected rotor EMF's utilizing a compact and reliable electronic module rather than auxiliary machines.

A further object is to provide speed and power factor control means for an a.c. induction motor by injected rotor EMF's wherein simple solenoidal windings replace the usual slip rings.

Another object is to provide variation and regulation of a.c. motor speed utilizing electronically derived rotor slip frequency voltages of the proper phase relationship and adjustable amplitude for insertion into the rotor circuit.

A still further object is to provide means for automatically adjusting the rotor injected voltage in an a.c. motor speed control system to maintain a desired speed irrespective of load fluctuations.

Still another object is to provide an injected rotor EMF motor speed control system operable both below and above synchronous speeds without current transformers, or similar apparatus of poor low frequency response in the slip frequency sensing circuit.

Yet another object is to provide an a.c. motor control system which allows the use of any rotor resistance to reduce or eliminate starting surges through control of injected rotor EMF's during starting.

Finally, it is an object of the invention to provide smooth, non-pulsed speed and power factor regulation of a.c. machines utilizing solid state means which generate and modulate slip frequency voltages of the appropriate amplitude and phase in response to variations in a feedback signal.

Other objects will in part be obvious and will in part appear hereinafter.

SUMMARY OF THE INVENTION

In accordance with the foregoing objectives, the invention employs a control module preferably constructed from solid state components. In the illustrated embodiment the control module is physically mounted on the output shaft of the motor being controlled with solenoidal windings provided on the rotor and stator in place of slip rings. However, conventional slip rings may be used and the control module mounted separately from the motor. Actual motor speed is sensed, in the disclosed form, by a stationary light source with fiber optics tubes positioned to direct the light onto sensors in the control module which rotate with the motor shaft.

A controlled reference signal is provided by the three phase power source. Circuits within the control module sense the frequency of the current in each of the three rotor phases and generate square wave signals having frequencies and phases corresponding to those of the rotor phases. The reference signal may be varied as desired to initiate changes in speed, and an amplified difference signal is provided in response to comparison of the reference signal and actual motor speed as sensed by the transducer.

The difference signal output is divided into equal positive and negative signal levels which are clamped at predetermined amplitude levels. These clamped signal levels are then applied to the rotor windings at the required current level to effect the desired speed change.

In the present invention speed control is achieved according to the principle of injected rotor EMF's but, unlike previously known systems in this category, does not require the use of auxiliary machines for introducing adjustable voltages of slip frequency into the rotor circuit for speed control. It also offers greater versatility since power factor control can be simultaneously achieved and speed control above synchronous speed is possible, if needed. The proposed means for electronically deriving the injected rotor voltages, as opposed to pulsed switching, is unique, allows elimination of slip rings, and improves the control range with the potential for eliminating line voltage harmonics and retains the advantage of not requiring the controller to handle full rated power of the motor.

A conventional slip ring induction motor with its stator connected to alternating line power and a speed transducer can be used with the proposed speed control scheme. Alternatively, slip rings can be eliminated by using solenoidal windings in addition to the conventional stator and rotor windings. No current transformers or auto-transformers are required for control. Desired speed changes are communicated to the rotor control module through the optical means resulting in variations of a reference voltage setting, corresponding to the desired speed. Speed control is achieved through modulation of the amplitude of the slip frequency, injected rotor voltages, as determined by feedback signals.

BRIEF DESCRIPTION OF THE DRAWINGS

The accompanying drawings are only for illustrative purposes:

FIG. 4b is an end view of the motor of FIG. 4a;

DESCRIPTION OF THE PREFERRED EMBODIMENT

Figure 1:
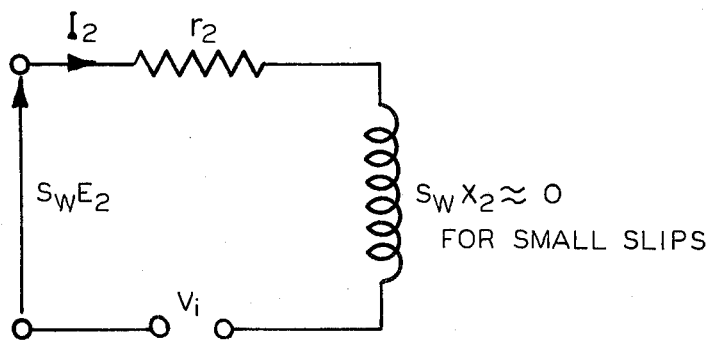
FIG. 1 represents a simplified diagram of the rotor equivalent circuit and is used to describe the theoretical basis for the present invention.
Figure 2A:
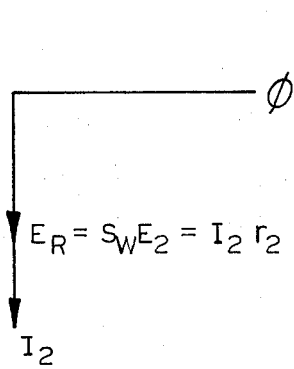
FIGS. 2a–2d are a series of diagrams further illustrating the theoretical principle on which the invention is based.
Figure 2B:
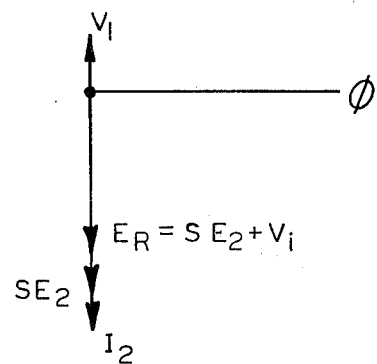
Figure 2C:
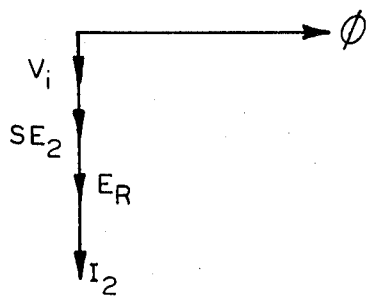
Figure 2D:
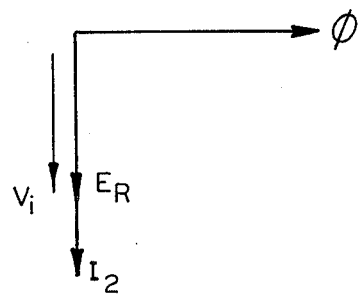

The principle of speed control using injected rotor EMF's is straightforward. For simplicity, assuming a constant torque load on the motor and neglecting rotor reactance at rated speed (small slips) the rotor equivalent circuit may be represented as in FIG. 1. With the above assumption, the torque $T$ is given by:

$$T = K \phi I_2 \qquad (1)$$

Where $K$ is the torque constant, $\phi$ is the gap flux, and $I_2$ is the rotor current. For a fixed applied voltage the flux is a constant. Hence, for a fixed load torque the rotor current is approximately constant.

By injecting an EMF from a source external to the rotor circuit, the rotor current may be increased or decreased, depending on the phase and/or magnitude of the injected voltage. The speed of the motor will be changed accordingly until the induced EMF reestablishes the previous current level demanded by the load.

The phasor diagrams for various, arbitrary values of the injected voltage are shown in FIG. 2. If $v_i$ is the injected voltage, and $s_w$ is the slip prior to its injection, then, for a fixed load torque, since $I_2$ is a constant:

$$s_w e_z = s e_2 \pm v_i \qquad (2)$$

and $$s = (s_w e_2 \mp v_i)/s_w \qquad (3)$$

Where $s$ = slip after voltage $v_i$ is injected and $e_2$ is the standstill rotor EMF. The negative sign is used when the induced EMF and the injected EMF are in phase, as in FIGS. 2c and 2d. The positive sign is used if they are in phase opposition, as in FIG. 2b.

It is easily seen that the slip corresponding to a given load torque, and hence the speed, can be controlled by varying the magnitude and phase of the injected voltage. The induction motor can be run above synchronous speed if the injected voltage is greater than the normal rotor induced voltage (without the injected voltage) and in phase with it. Speed control over a wide range is obtained by injecting a variable voltage of the appropriate phase and rotor frequency. Constant speed is achieved at a particular speed setting using a speed transducer for feedback. Since the frequency of the rotor EMF's and currents change with speed, for stable operation, the frequency of the injected voltage must change correspondingly. The method of speed control presented achieves all of these well known theoretical features electronically. In addition, the closed-loop technique presented allows for power factor corrections through the loop phase shifter.

Figure 3:
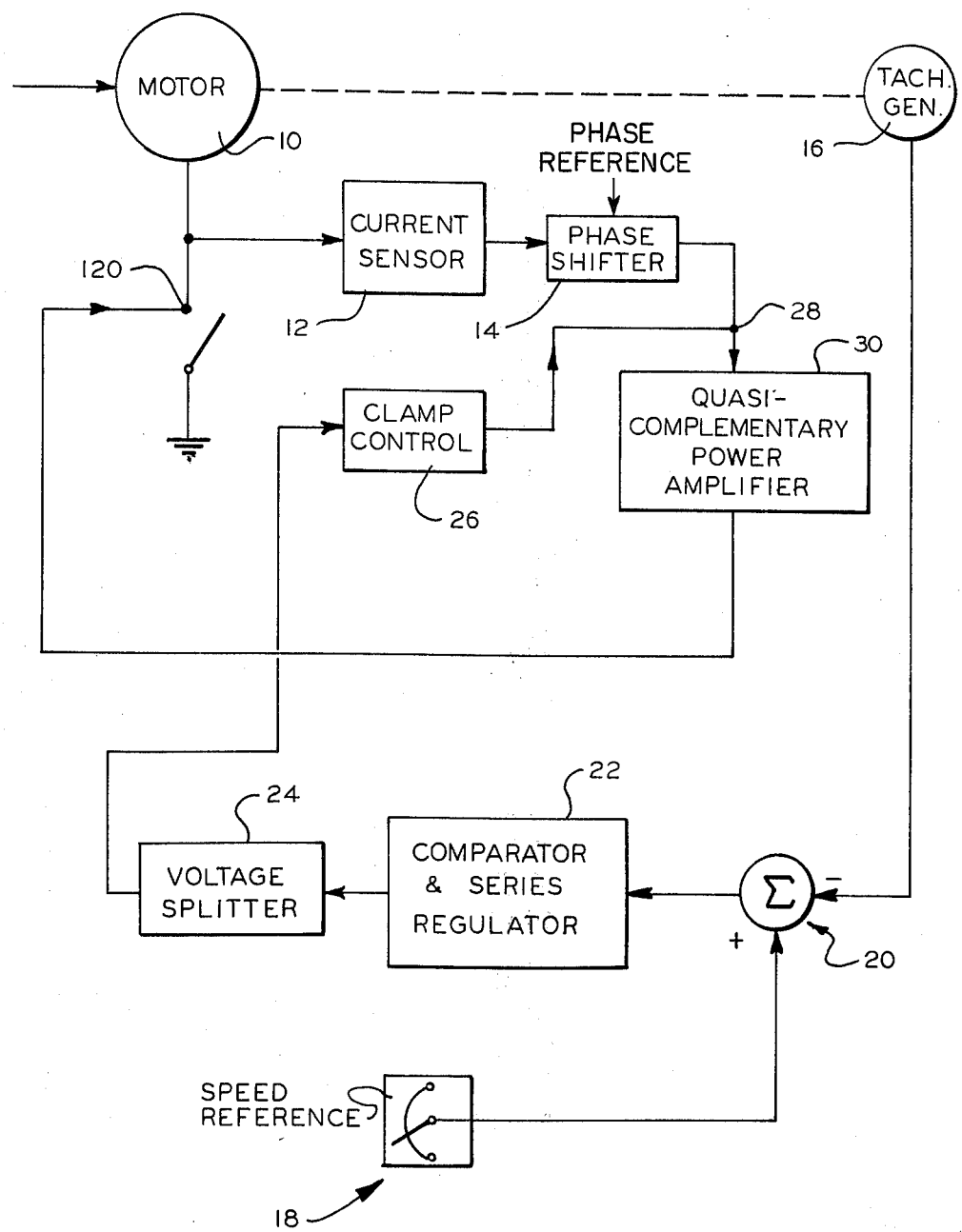
FIG. 3 is a block diagram of the major units for implementing the control mode according to the present invention.

The control mode for the present invention is shown in block diagram form in FIG. 3, as utilized with a 3 phase induction motor, indicated by the numeral 10.

The current in each phase of the rotor windings is sensed by a respective sensing circuit, the three circuits being collectively represented by block 12. Each sensing circuit is connected to a phase shifter 14 which acts as a delay circuit so that the injected voltages will be at the proper phase angle, in the event that power factor control is desired. Speed control may be effected as described without the use of phase shifters.

The actual speed of motor 10 at any given time is reflected as an analog voltage from tachometer generator 16, or an appropriate digital to analog speed sensor. A second analog voltage which is selectively set by any convenient voltage varying means, indicated schematically by reference numeral 18, is summed at junction 20, with the signal from tach generator 16. Any difference between the two voltages representing actual and desired speed will be evidenced by a difference signal applied to comparator and series regulator 22. This provides a d.c. voltage level corresponding to the peak-to-peak voltage required by the error signal to reestablish equilibrium at the desired speed setting. This peak-to-peak amplitude is divided symmetrically by voltage splitter 24 into positive and negative levels. These are applied to clamp controls 26 which are connected to each phase of the outputs of phase shifters 14 to clamp the square wave signals at the terminal indicated at 28 at the required levels. Thus, only that portion of the square wave signals required to reestablish equilibrium by being reflected as an injected rotor EMF are allowed to pass terminal 28. Quasi-complementary power amplifiers 30 bring the power level to the value required for injection into the rotor circuits of motor 10, and are connected directly thereto.

Figure 4A:
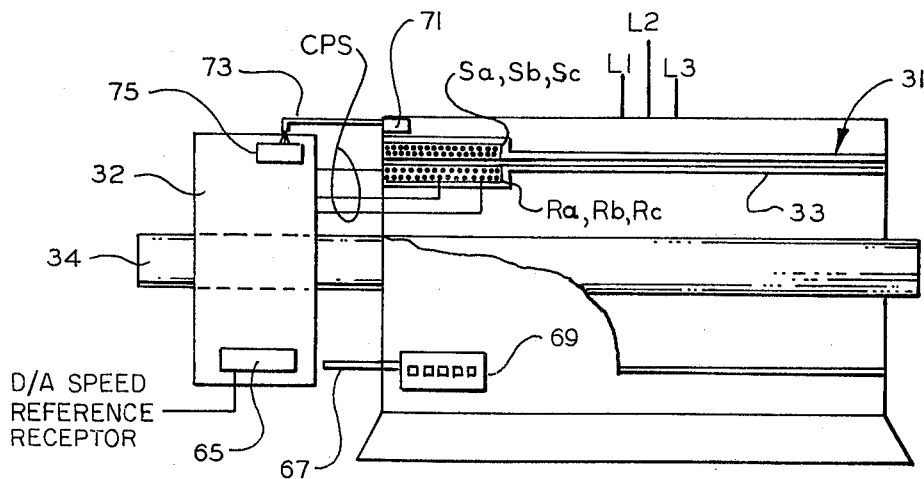
FIG. 4a is a somewhat diagrammatic, side elevational view, partly in section, of a preferred embodiment of the invention incorporated in a three-phase induction motor.
Figure 4B:
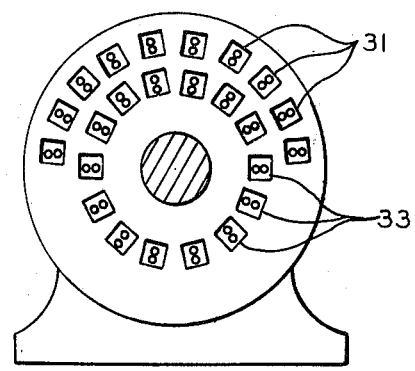

While a conventional slip ring motor can be used, a motor incorporating a simple modification that will allow elimination of slip rings is shown in FIG. 4. In addition to the conventional 3-phase windings 31 on the stator, a 3-phase solenoidal winding Sa, Sb, Sc is shown, energized by the same source L1, L2, L3 as the normal 3-phase stator winding. Similarly, in addition to the conventional 3-phase rotor winding 33, a 3-phase solenoidal winding concentric with the stator winding, is shown at Ra, Rb, Rc. This solenoidal winding in conjunction with the stator solenoidal winding Sa, Sb, Sc acts like a transformer furnishing a fixed frequency AC supply for control module 32 mounted on output shaft 34 of the rotor, with interconnections CPS between the solenoidal windings Ra, Rb, Rc and the control module.

Figure 5:
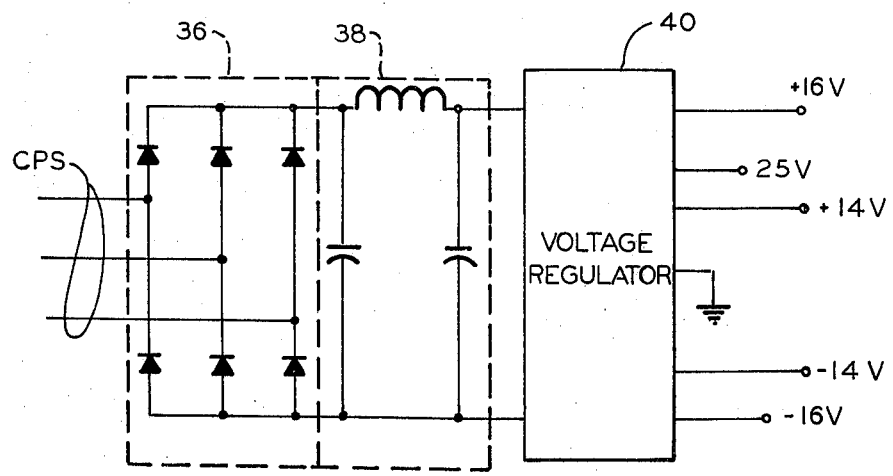
FIG. 5 is a schematic diagram of the control circuit power supply derived from the solenoidal windings of the motor shown in FIGS. 4a and 4b.

The interconnections CPS are shown connected (FIG. 5) to a standard 3-phase rectifier bridge 36, mounted in the control module. This rectified voltage is filtered using a standard LC, $\pi$ - filter 38. The filtered output is regulated, using standard voltage regulation means 40 to provide control voltages of $\pm 16V$, $\pm 14V$ and 25V. These control voltages are connected to subsequent control circuit modules as described below.

Figure 6:
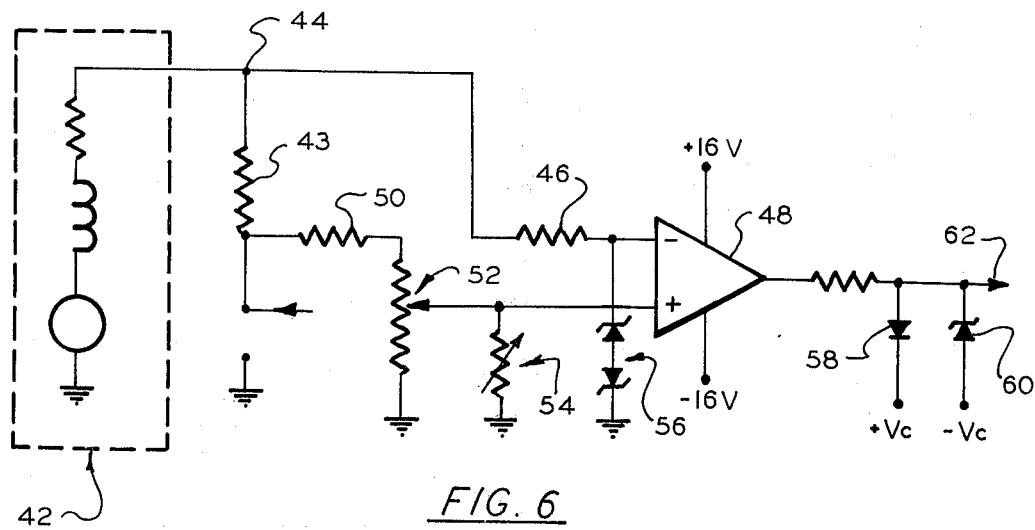
FIG. 6 is a schematic diagram of the sensing circuit that provides means for generating square waves at the rotor slip frequency.

Circuit details of each of the individual blocks indicated in the block diagram of FIG. 3 are now described in detail. FIG. 6 shows the sensing circuit for one phase, a similar circuit being provided for each of the other two phases. A shunt 43 is connected in series with the rotor circuit. The signal at terminal 44 is fed through resistor 46 to an operational amplifier 48. The other end of shunt 43 is connected through resistor 50 to potentiometer 52 which is grounded at the other end. This potentiometer is used to null the effect of the externally injected voltage $V_i$. Potentiometer 54 is used to refine the setting. Back-to-back zener diodes 56 are connected between the non-inverting input of operational amplifier 48 and ground for protection. Regardless of the frequency of the rotor circuit the open-loop amplifier 48 produces a square wave output of the same frequency. This output wave form is clamped to the appropriate injected voltage amplitude by diodes 58 and 60 which clamp the square wave to amplitude $\pm V_c$; means for deriving $\pm V_c$ is described later. The clamped square wave at point 62 is fed through phase shifter 14, whose output is connected to quasi-complimentary power amplifier 30. Phase shifters 14 are conventional delay circuits phase lock loops, well known in the art, and optionally present in the present circuit only when power factor control is desired.

Figure 7:
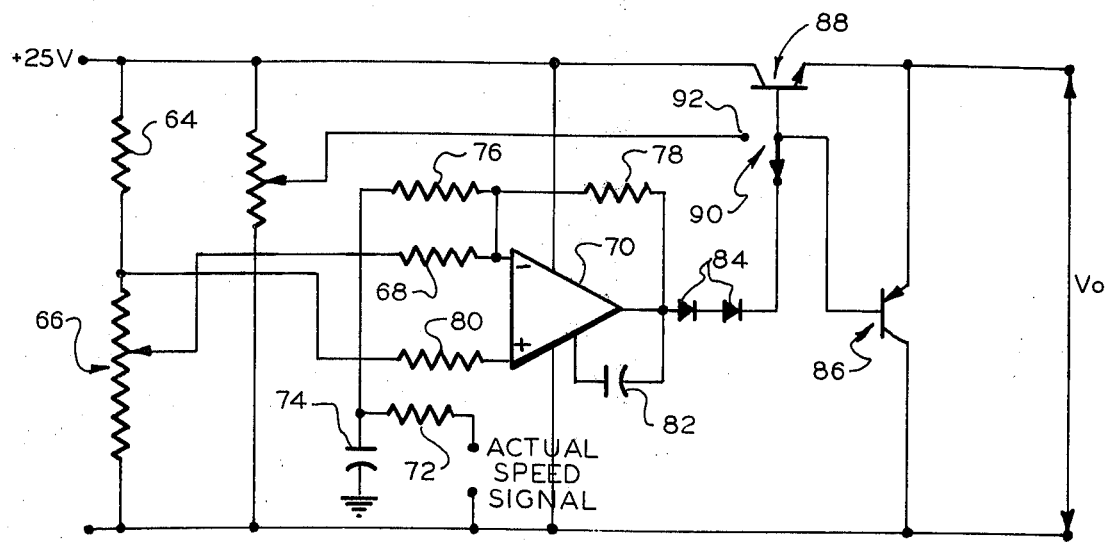
FIG. 7 is a schematic diagram of an error detecting-/comparator circuit that produces a DC signal equal to the peak-to-peak amplitude of the injected voltage.

FIG. 7 illustrates a schematic for comparator and series regulator 22. The +25v supply is obtained from the corresponding output voltage terminal of the control circuit power source shown in FIG. 5. Resistor 64 together with potentiometer 66 form a variable potential divider circuit and furnish an adjustable speed reference signal, as indicated by reference numeral 18 in FIG. 3.

The adjustable speed reference signal may also be obtained from a standard D/A converter, such as shown in FIG. 4. D/A converter 65 is mounted in control module 32 for rotation therewith on shaft 34. The digital signal may be fed to D/A converter 65 remotely through fiber optic tubes 67 with interruptable light sources 69 allowing a coded signal to be fed in. Such an arrangement would replace speed reference potentiometer 66.

Referring again to FIG. 7, the reference signal is fed through resistor 68 to the non-inverting input of comparator amplifier 70. The feed back voltage derived from a speed transducer (tach generator 16 of FIG. 3 or a light source 71 mounted on the stator piped through a fiber optic tube 73 to impinge on a photosensor 75 once per revolution, in a digital speedometer arrangement, which serves as the input to the D/A converter of the closed-loop feedback circuit) is filtered by the resistor 72, capacitor 74 combination. The filtered feedback voltage is fed through resistor 76 to the non-inverting input of comparator amplifier 70, the closed-loop gain of which is determined by resistor 78. Resistor 80 is used to balance the resistances at the input of the comparator amplifier. Capacitor 82 is used for frequency compensation. Diodes 84 provide means for biasing the base of transistor 86. Transistor 88 serves as a series regulator. In order to prevent turn-off of the series regulator when the output voltage of this circuit exceeds the series regulator voltage, by-pass transistor 86 is provided, allowing the series regulator to drive a current through this transistor. The output $V_o$ of the series regulator circuit is dependent on its base drive with switch 90 in the closed-loop position, as shown. This switch may be selectively connected to terminal 92 for open-loop operation. The voltage at the base of transistor 86 is governed by the output of the differential comparator amplifier 70 which produces an output to drive the error signal between the speed reference and the feedback voltage to zero, maintaining motor speed at the desired setting. The output voltage $V_o$ is proportional to the desired peak-to-peak amplitude of the injected voltage.

Figure 8:
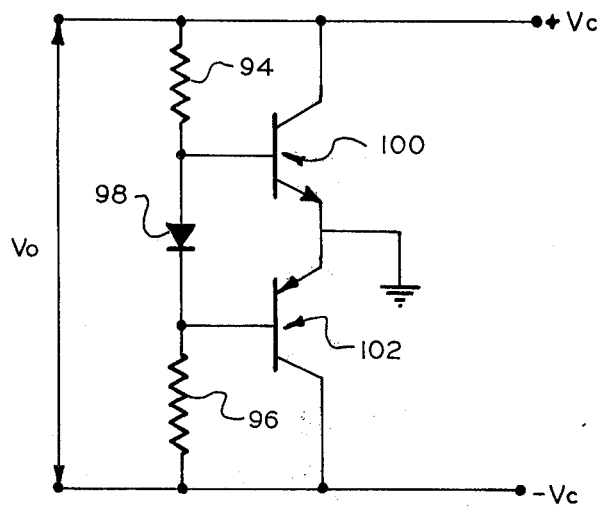
FIG. 8 is a schematic diagram of a voltage splitting circuit for dividing the peak-to-peak DC signal into a symmetric positive and negative amplitude.

The voltage $V_o$ is fed to the voltage splitter circuit shown in FIG. 8. In this circuit resistors 94 and 96, together with diode 98, serve to bias transistors 100 and 102 such that their collector voltages are symmetrically above $(+V_c)$ and below $(-V_c)$ ground, respectively. The $+V_c$ output of this circuit serves to clamp the positive half of the square wave output of amplifier 48 (FIG. 6) through diode 58, and the $-V_c$ output clamps the negative output amplitude of the square wave of said amplifier through diode 60.

Figure 9:
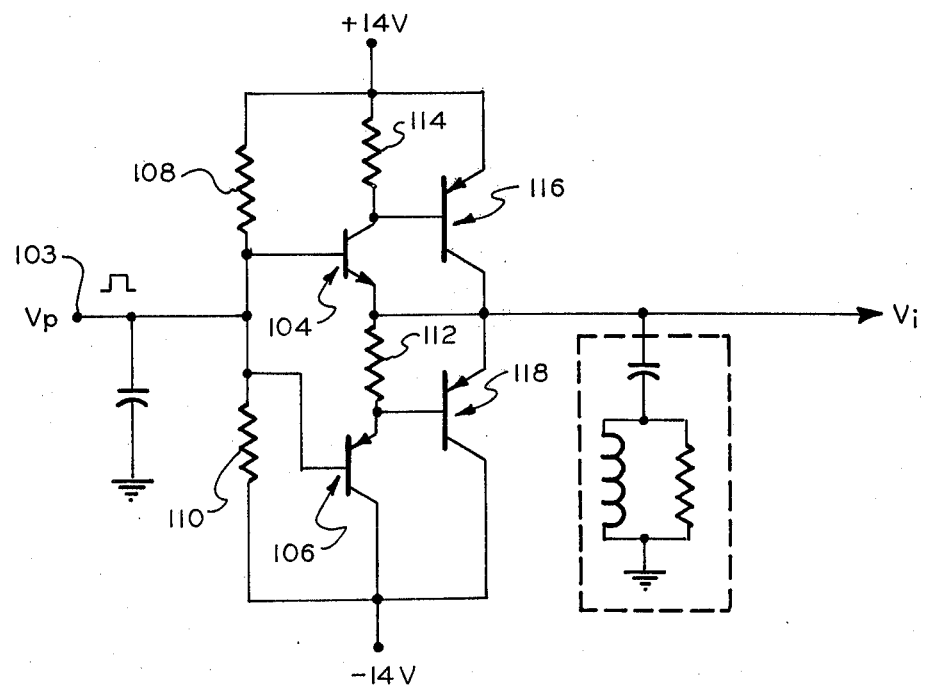
FIG. 9 is a schematic diagram of a circuit for amplifying the clamped square waves for injection into the rotor circuit.

The clamped square wave is fed to the output of phase shifters 14 whose output $V_p$ is fed to the base junction of transistors 104 and 106 of the quasi complimentary power amplifier 30, circuit details of which are shown in FIG. 9. The base of NPN transistor 104 is connected through resistor 108 to the +14 volt terminal of the power supply shown in FIG. 5. Similarly, the base of PNP transistor 106 is connected through resistor 110 to the −14 volt terminal of the power supply of FIG. 5. The collector of transistor 106 is also connected to the −14V supply while its emitter is connected through resistor 112 to the emitter of transistor 104. The collector of transistor 104 is connected to the +14V terminal through resistor 114. The emitter of transistor 116 is connected to the +14V terminal and its base is connected to the collector of transistor 104. The collector of transistor 116 is connected to the emitters of transistor 104 and 118. The base of transistor 118 is connected to the emitter of transistor 106 and its collector is connected to the −14V terminal. With the input voltage at terminal 103 positive and clamped to the desired amplitude of the injected voltage, transistor 104, connected as an emitter follower, is turned on along with its complementary output transistor 118. The voltage at the emitter of transistor 118 follows the base voltage of transistor 104, and thus the voltage $V_i$ is injected into the rotor of the induction motor at terminal 120 shown in the block diagram of FIG. 3.

It is to be noted that the amplitude of $V_p$ and hence $V_i$ is determined by the speed of the motor, which is detected by the speed transducer and compared to the reference setting, as is standard in feedback control circuitry. The desired speed can be varied by dialing a new reference voltage setting. Any speed variation from the desired setting is detected by the comparator and the amplified error signal readjusts the magnitude of the injected voltage through the clamping action of the variable control voltage $\pm V_c$.

Tests conducted on a 7.5 HP, 3-phase, wound rotor induction motor indicate excellent speed regulation, with tight feed back over a wide range of speeds up to and beyond synchronous speed and the ability to incorporate power factor control in the speed control scheme. The control voltages and/or circuitry may vary with the size and speed control range of the motor in question, in accordance with principles well known in the art.

From the description of the foregoing preferred embodiment, it is evident that the dilineated objects and features of the herein described invention will be achieved.

Numerous modifications, including the use of silicon controlled rectifiers for achieving control according to the principles described will no doubt suggest themselves to those skilled in the art without departing from the crux of the invention and, hence we do not wish to be restricted to the specific form shown for illustrative purposes on the mentioned uses, except to the extent indicated in the appended claims. Although the invention has been shown and described in connection with a multi-phase a.c. motor, it will be understood that the basic novel features may be employed in connection with rotating electrical machinery other than motors, and with other power sources including d.c. and single phase a.c.

What is claimed is:

1. A control system for AC machinery comprising:
   a. a source of three-phase power providing a controlled reference signal;
   b. means for sensing the frequency of the currents in each of the three rotor phases;
   c. means for generating square wave signals of the respective frequencies and phases of each rotor phase in response to signals received from said sensing means;
   d. means for generating a signal commensurate with actual rotational speed of the machine;
   e. means for selectively varying said reference signal;
   f. means for comparing said signal commensurate with actual rotational speed and said varied reference signal and providing an amplified difference signal output;
   g. means for dividing said signal output into equal positive and negative signal levels;
   h. means for clamping said signal levels at predetermined amplitude levels; and
   i. means for applying said clamped signal levels to the respective rotor windings at the required current level.

2. The invention according to claim 1 and further including a solenoidal winding on each of the stator and rotor of the machine for each of the three phases for voltage transfer between stationary and moving parts, thereby eliminating the need for brushes.

3. The invention according to claim 2 wherein at least a portion of said varying means is carried on a rotating portion of the machine.

4. The invention according to claim 3 wherein said varying means includes a light source and means electrically responsive thereto.

5. The invention according to claim 4 wherein said means for generating a signal commensurate with actual speed comprises a tachometer generator.

6. A control system for a rotary electrical machine having a stator and a rotor, each with windings forming separate circuits, said system comprising, in combination:
   a. a source of electrical power providing a reference voltage;
   b. means for selectively varying said reference voltage;
   c. means for generating a first signal proportional to actual rotational speed of the machine;
   d. means for comparing said varied reference voltage with said first signal and providing a difference signal output;
   e. means for amplifying said difference signal by a predetermined gain to provide a second signal;
   f. means for deriving from the rotor circuit a third signal, commensurate with rotor frequency and phase;
   g. means for amplifying said third signal by a predetermined gain; and
   h. means for applying to the rotor circuit an injected voltage comprising a portion of said third signal selected as a function of the amplitude of said second signal.

7. The invention according to claim 6 wherein said machine is a DC machine.

8. The invention according to claim 6 wherein said machine is an AC machine.

9. The invention according to claim 8 and further including means for applying said injected voltage in a predetermined phase relationship to the induced rotor voltage, thereby effecting power factor control.

10. The invention according to claim 6 wherein said last-named means comprise means for applying said third signal continuously to the rotor circuit, whereby rotor power pulsations are avoided.

* * * * *